US012162477B2

(12) United States Patent
Alghanem et al.

(10) Patent No.: US 12,162,477 B2
(45) Date of Patent: Dec. 10, 2024

(54) SYSTEMS AND METHOD FOR LIDAR GRID VELOCITY ESTIMATION

(71) Applicant: FORD GLOBAL TECHNOLOGIES, LLC, Dearborn, MI (US)

(72) Inventors: Basel Alghanem, Pittsburgh, PA (US); Benjamin David Ballard, Pittsburgh, PA (US); Russell Schloss, Pittsburgh, PA (US); Christian Höeppner, Munich (DE); Mark Ollis, Pittsburgh, PA (US); George Peter Kenneth Carr, Allison Park, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 574 days.

(21) Appl. No.: 17/486,681

(22) Filed: Sep. 27, 2021

(65) Prior Publication Data
US 2023/0098223 A1 Mar. 30, 2023

(51) Int. Cl.
*B60W 30/09* (2012.01)
*B60W 60/00* (2020.01)
(Continued)

(52) U.S. Cl.
CPC ........ *B60W 30/09* (2013.01); *B60W 60/0027* (2020.02); *G01S 17/58* (2013.01);
(Continued)

(58) Field of Classification Search
None
See application file for complete search history.

(56) References Cited

U.S. PATENT DOCUMENTS

| 7,400,266 B2 | 7/2008 | Haug |
| 9,383,753 B1 | 7/2016 | Templeton et al. |
| | (Continued) | |

FOREIGN PATENT DOCUMENTS

| AU | 2018204468 A1 | 7/2018 |
| CN | 109839093 A | 6/2019 |
| | (Continued) | |

OTHER PUBLICATIONS

Kuan-Hui, Lee et al., "PillarFlow: End-to-end Birds-eye-view Flow Estimation for Autonomous Driving," arxiv.org, Cornell University Library, 201 Olin Library Cornell University Ithaca, NY 14853, Aug. 3, 2020.

(Continued)

*Primary Examiner* — Abdhesh K Jha
*Assistant Examiner* — Jonathan E Reinert
(74) *Attorney, Agent, or Firm* — Frank A. MacKenzie; Brooks Kushman, P.C.

(57) ABSTRACT

Systems and methods are described for measuring velocity of an object detected by a light detection and ranging (lidar) system. According to some aspects a method may include receiving a lidar dataset generated by the lidar system, transforming the lidar dataset into a first layer dataset and a second layer dataset, and converting the first layer dataset into a first image and the second layer dataset into a second image. The method may also include performing a feature detection operation that identifies at least one feature in the first image and the same feature in the second image, locating a first location of the feature in the first image and a second location of the feature in the second image, and generating a velocity estimate of the feature based on a difference between the first location and the second location and a difference between the different time intervals.

18 Claims, 9 Drawing Sheets

(51) Int. Cl.
　　*G01S 17/58*　　　(2006.01)
　　*G01S 17/89*　　　(2020.01)
　　*G01S 17/931*　　(2020.01)
(52) U.S. Cl.
　　CPC ............ *G01S 17/89* (2013.01); *G01S 17/931* (2020.01); *B60W 2420/408* (2024.01); *B60W 2554/4042* (2020.02); *B60W 2554/4043* (2020.02)

(56) References Cited

U.S. PATENT DOCUMENTS

| | | | |
|---|---|---|---|
| 9,989,629 | B1 | 6/2018 | LaChapelle |
| 10,031,214 | B2 | 7/2018 | Rosenzweig et al. |
| 10,036,801 | B2 | 7/2018 | Retterath et al. |
| 10,073,177 | B2 | 9/2018 | Montoya et al. |
| 10,120,076 | B2 | 11/2018 | Scheim et al. |
| 10,191,154 | B2 | 1/2019 | Kadambi et al. |
| 10,197,669 | B2 | 2/2019 | Hall et al. |
| 10,203,399 | B2 | 2/2019 | Retterath et al. |
| 10,254,762 | B2 | 4/2019 | McWhirter et al. |
| 10,295,668 | B2 | 5/2019 | LaChapelle et al. |
| 10,295,671 | B2 | 5/2019 | Gazit et al. |
| 10,451,716 | B2 | 10/2019 | Hughes et al. |
| 11,948,381 | B2 * | 4/2024 | Bankiti .................... G01S 17/42 |
| 2018/0164439 | A1 | 6/2018 | Droz et al. |
| 2018/0284225 | A1 | 10/2018 | Weed et al. |
| 2019/0011544 | A1 | 1/2019 | Gassend et al. |
| 2019/0018416 | A1 | 1/2019 | Gassend |
| 2019/0025408 | A1 | 1/2019 | Hwang et al. |
| 2019/0063915 | A1 | 2/2019 | Hinderling et al. |
| 2019/0079167 | A1 | 3/2019 | Gaalema et al. |
| 2019/0086931 | A1 | 3/2019 | Templeton et al. |
| 2019/0107606 | A1 | 4/2019 | Russell et al. |
| 2019/0107623 | A1 | 4/2019 | Campbell et al. |
| 2019/0162825 | A1 | 5/2019 | Bestler et al. |
| 2019/0212450 | A1 | 7/2019 | Steinberg et al. |
| 2020/0097019 | A1 | 3/2020 | Yu et al. |
| 2020/0114907 | A1 | 4/2020 | Sims, III et al. |
| 2020/0309915 | A1 | 10/2020 | Beuschel et al. |
| 2020/0341482 | A1 | 10/2020 | Hufnagel et al. |
| 2021/0056712 | A1 | 2/2021 | Daudelin et al. |
| 2022/0107414 | A1 * | 4/2022 | Maheshwari ........... G01S 7/412 |
| 2022/0317300 | A1 * | 10/2022 | Stenson ................ G06V 20/58 |

FOREIGN PATENT DOCUMENTS

| | | |
|---|---|---|
| DE | 102016213983 A1 | 2/2018 |
| EP | 3385752 A1 | 10/2018 |
| WO | WO 2018/055449 A2 | 3/2018 |
| WO | WO 2018/093613 A1 | 5/2018 |
| WO | WO 2018/192897 A1 | 10/2018 |
| WO | WO 2019/115149 A1 | 6/2019 |
| WO | WO 2019/149688 A1 | 8/2019 |

OTHER PUBLICATIONS

European Search Report in corresponding international application No. EP22197788 dated Feb. 14, 2023, 10 pages.
Object tracking based on evidential dynamic occupancy grids in urban environments, 7 pages.
Evidential Grid-Based Tracking and Mapping, 14 pages.
Grid-Based Environment Estimation Using Evidential Mapping and Particle Tracking, 13 pages.
Grid-Based Object Tracking with Nonlinear Dynamic State and Shape Estimation, 19 pages.
Conditional Monte Carlo Dense Occupancy Tracker, 6 pages.
Perception and Automation for Intelligent Mobility in Dynamic Environments, 4 pages.
Real-time 3D LiDAR Flow for Autonomous Vehicles, 8 pages.
PointFlowNet: Learning Representations for Rigid Motion Estimation from Point Clouds, 33 pages.
Rigid Scene Flow for 3D LiDAR Scans, 6 pages.
Efficient Bird Eye View Proposals for 3D Siamese Tracking, 13 pages.
Leveraging Shape Completion for 3D Siamese Tracking, 10 pages.

* cited by examiner

SYSTEMS AND METHOD FOR LIDAR GRID VELOCITY ESTIMATION

FIELD

The present disclosure relates generally to object detection systems. More particularly, the present disclosure relates to implementing systems and methods for estimating velocities of detected objects within a lidar grid and providing downstream autonomous vehicle driving solutions.

BACKGROUND

Modern day vehicles can be configured to operate in an autonomous mode in which the vehicle navigates through an environment with little or no input from a driver. Such autonomous vehicles can include one or more sensors that detect information about the environment in which the vehicle operates. The vehicle and its associated computer-implemented controller use the detected information to navigate through the environment. For example, if the sensors detect that the vehicle is approaching an obstacle, as determined by the computer-implemented controller, the controller adjusts the vehicle's directional controls to cause the vehicle to navigate around the obstacle.

One such sensor is a light detection and ranging (lidar) device. A lidar device actively estimates distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. A three-dimensional map of points of reflective features is generated based on the returning pulses for the entire scanning zone. The three-dimensional point map thereby indicates positions of reflective objects in the scanned scene, and may be referred to as lidar grid as well.

Autonomous vehicle navigation systems, however, still have some challenges. For example, conventional autonomous vehicle navigation systems insufficiently predict the behavior of a detected object in order to determine an intermediate and a future course of action for navigating the autonomous vehicle. Improving the projection accuracy of detected objects will continue to be a vital component for the success of autonomous vehicle technology and the present systems and methods of this disclosure address the aforementioned problems.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
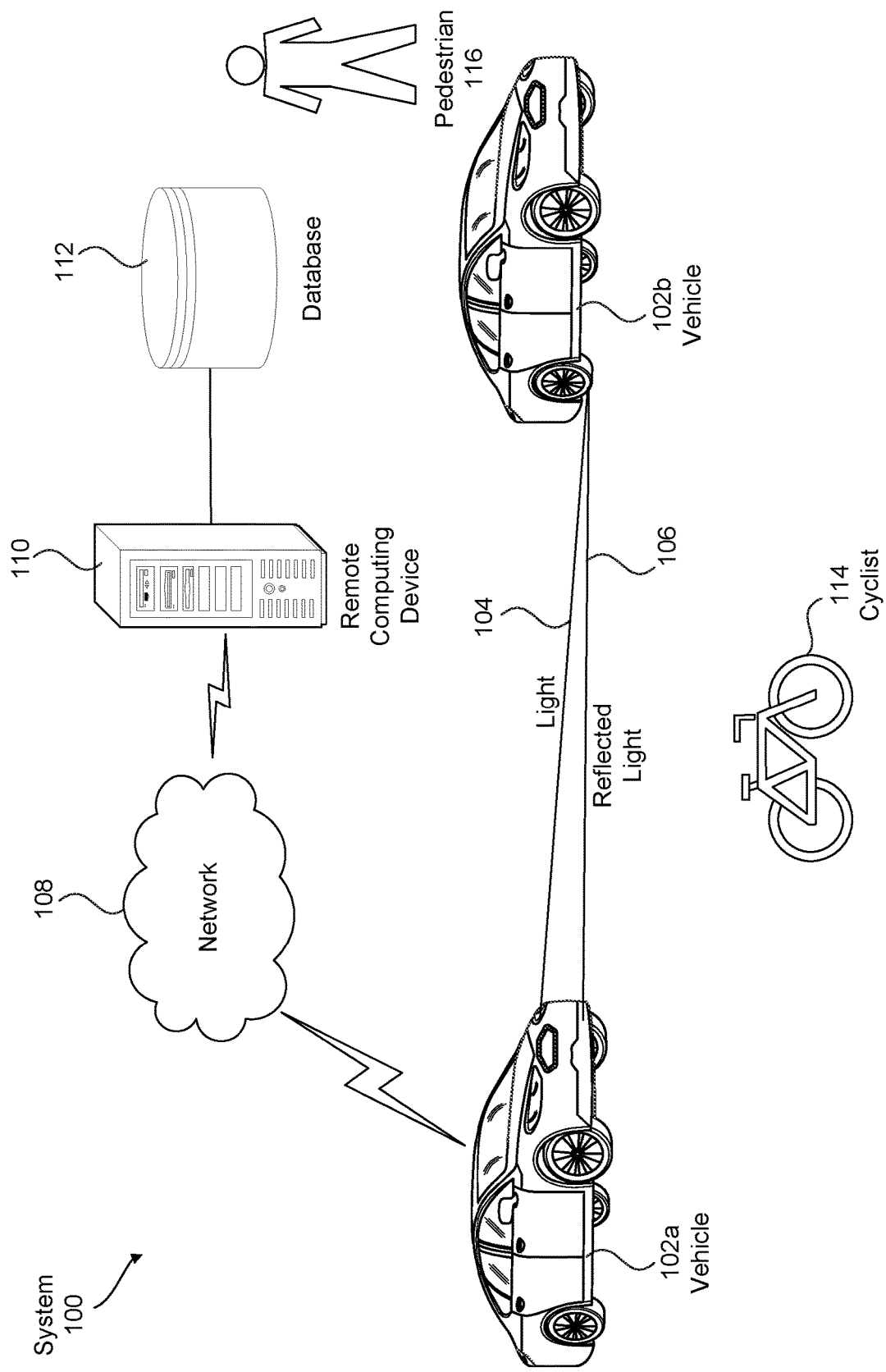
FIG. 1 illustrates an exemplary autonomous vehicle system, in accordance with aspects of the disclosure.

The development and mass production of autonomous vehicles (AVs) has the potential to revolutionize transportation mobility and safety. AVs combine a variety of sensors to perceive their surroundings, such as radar, lidar, sonar, GPS, odometry and inertial measurement devices. In some aspects, advanced control systems may interpret sensory information to identify appropriate navigation paths, as well as detect obstacles and relevant signage.

One key sensor that AVs rely on is lidar, which relies on systems and methods for determining ranges by targeting an object with a laser and measuring the time for the reflected light to return to the receiver. According to some aspects, lidar may be used to make digital 3-D representations of areas of a perception region (e.g., an area surrounding the AV). Within the 3-D representations (also known as lidar grids), a lidar computing system, or an on-board computing device (such as computing device 220 discussed herein below) may detect a moving object within the perception region, may generate one or more possible object trajectories for the detected object and the AV, and may analyze the possible object trajectories to assess the probability of a collision between the object and the AV. If the probability exceeds an acceptable threshold, the on-board computing device may perform operations to determine whether the collision can be avoided if the AV follows a defined vehicle trajectory and/or implements one or more dynamically generated emergency maneuvers to be performed in a predefined time period (e.g., N milliseconds). If the collision can be avoided, then the on-board computing device may cause the vehicle to perform a cautious maneuver (e.g., mildly slow down, accelerate, or swerve). In contrast, if the collision cannot be avoided, then the on-board computing device may cause the vehicle 200 to take an emergency maneuver (e.g., brake and/or change direction of travel).

In order to properly assess the collision probability, the lidar, and by extension, the on-board computing device may need to capture behavioral attributes of a detected object in order to project a future location of the detected object. Behavioral attributes may include, for example, relative movement and direction (e.g., velocity) of the detected object. It can be appreciated that determining a velocity of the detected object (e.g., speed and direction) can further enable on-board computing device 220 to generate more accurate object trajectories.

According to aspects of the present disclosure, systems and methods are provided for improved detection of object velocities that can enable an on-board computing device to more accurately, and more expeditiously determine a collision probability assessment, and to provide an appropriate course of action for the AV in a timely manner. Specifically, aspects of the present disclosure provide for an improved method to calculate velocities of detected objects within a lidar perception region. According to some aspects, this may be done by converting the lidar grid into an image and performing image processing techniques to determine object velocities. According to some aspects, performing image processing techniques on converted images (from lidar grid) can significantly decrease the processing time and the processing bandwidth for object detection. This is because processing a lidar grid for object detection requires the processing of every cell within the lidar grid, which is time consuming and computationally expensive. The benefits provided by the embodiments discussed herein decrease processing time and bandwidth, and can further enable on-board computing device 220 to generate faster object trajectories. This is especially important for AVs operating in the field, where faster detection and decision-making capabilities (due to decreased processing time and bandwidth) can help an AV generate and execute faster navigation-based decisions, thereby resulting in improved safety and operation of the AV. As also noted herein, the reduction of processing time and bandwidth also improves power consumption, thereby increasing a total range of a battery operated AV for example.

It can be appreciated that the techniques described herein provide several benefits over existing systems. For example, the increased accuracy of object velocities can reduce the number of projections, or estimates of where the object is going and how fast. This, in turn, increases system efficiency and, importantly, reduces power consumption and computational processing of the on-board computing device. This is especially important with the advent of electrification in AVs. As more and more cars will continue to rely on battery power as an energy source, the amount of energy used by the on-board computing device/system will play a key role in the distance that electric vehicles can go between charges.

Aspects of the present disclosure also provide improvements over existing systems with regard to computational speed and safety. By reducing the number of projections or estimates, the computational bandwidth and resources of the on-board computing device are freed up and this provides for faster collision probability assessment (both based on improved accuracy and increased bandwidth). According to some aspects, the improved processing performance may also lead to improvement in navigation safety, because the system provides accurate collision probability assessments in a timelier manner. For example, by expediting the processing and speed by which a collision probability assessment is processed and output, the on-board computing device can provide faster recommendations for courses of action, thereby resulting in improved safety performance.

According to some aspects, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications. It can be appreciated that the embodiments used herein describe aspects of the present solution. It can also be appreciated that all embodiments are exemplary and can be combined with other embodiments.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as autonomous vehicle (AV) 102a. AV 102a can include, but is not limited to, a land vehicle (as shown in FIG. 1), an aircraft, or a watercraft.

AV 102a is generally configured to detect objects 102b, 114, and 116 in proximity thereto. The objects can include, but are not limited to, a vehicle 102b, cyclist 114 (such as a rider of a bicycle, electric scooter, motorcycle, or the like) and/or a pedestrian 116. When such a detection is made, AV 102a performs operations to generate one or more possible object trajectories for the detected object and analyze at least one of the generated possible object trajectories to determine whether or not there is an undesirable level of probability that a collision will occur between the AV and object in a threshold period of time (e.g., 1 minute). This may also be referred to as collision probability assessment hereinafter. If so, the AV 102a performs operations to determine whether the collision can be avoided if a given vehicle trajectory is followed by the AV 102a and any one of a plurality of dynamically generated emergency maneuvers is performed in pre-defined time period (e.g., N milliseconds). If the collision can be avoided, then the AV 102a takes no action or optionally performs a cautious maneuver (e.g., mildly slows down). In contrast, if the collision cannot be avoided, then the AV 102a immediately takes an emergency maneuver (e.g., brakes and/or changes direction of travel). Other approaches to collision detection and avoidance by AV 102a are contemplated by this disclosure as would be understood by one skilled in the relevant art.

Figure 2:
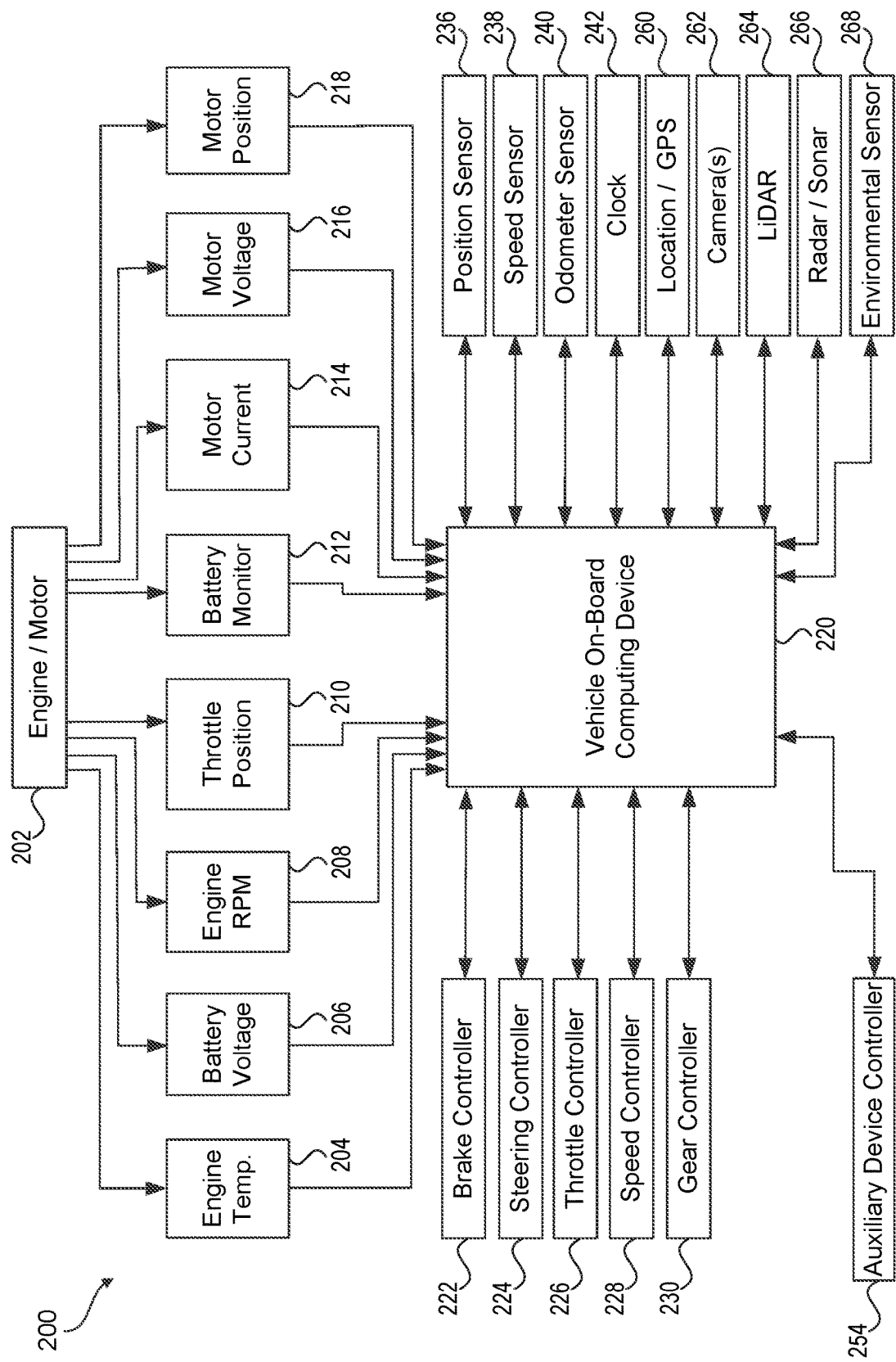
FIG. 2 illustrates an exemplary architecture for a vehicle, in accordance with aspects of the disclosure.

As will be described in greater detail in association with FIG. 3, AV 102a may be configured with a lidar system 300. Lidar system 300 may include a light emitter system 304 (transmitter) that transmits a light pulse 104 to detect objects located within a distance or range of distances of AV 102a. Light pulse 104 may be incident on one or more objects (e.g., AV 102b) and be reflected back to lidar system 300. Reflected light pulse 106 incident on light detector 308 is processed by lidar system 300 to determine a distance of that object to AV 102a. Light detector 308 may, in some embodiments, contain a photodetector or array of photodetectors positioned and configured to receive the light reflected back into the system. Lidar information, such as detected object data, is communicated from lidar system 300 to an on-board computing device 220 (FIG. 2). AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a and/or 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling and to detect objects. These sensors may include, for example: a location sensor 260 (e.g., a Global Positioning System ("GPS") device); one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

When the vehicle on-board computing device 220 detects a moving object, the vehicle on-board computing device 220 generates one or more possible object trajectories for the detected object, and analyzes the possible object trajectories to assess the probability of a collision between the object and the AV. If the probability exceeds an acceptable threshold, the vehicle on-board computing device 220 performs operations to determine whether the collision can be avoided if the AV follows a defined vehicle trajectory and/or implements one or more dynamically generated emergency maneuvers is performed in a pre-defined time period (e.g., N milliseconds). If the collision can be avoided, then the vehicle on-board computing device 220 may cause the vehicle 200 to perform a cautious maneuver (e.g., mildly slow down, accelerate, or swerve). In contrast, if the collision cannot be avoided, then the vehicle on-board computing device 220 causes the vehicle 200 to take an emergency maneuver (e.g., brake and/or change direction of travel).

According to some aspects, behavioral attributes of the detected object is relevant to the generated possible object trajectories and is a factor when determining how to assess the probability. Behavioral attributes may include, for example, relative movement and direction (e.g., velocity) of the detected object. It can be appreciated that determining a velocity of the detected object (e.g., speed and direction) can further enable on-board computing device 220 to generate more accurate possible object trajectories.

Figure 3:
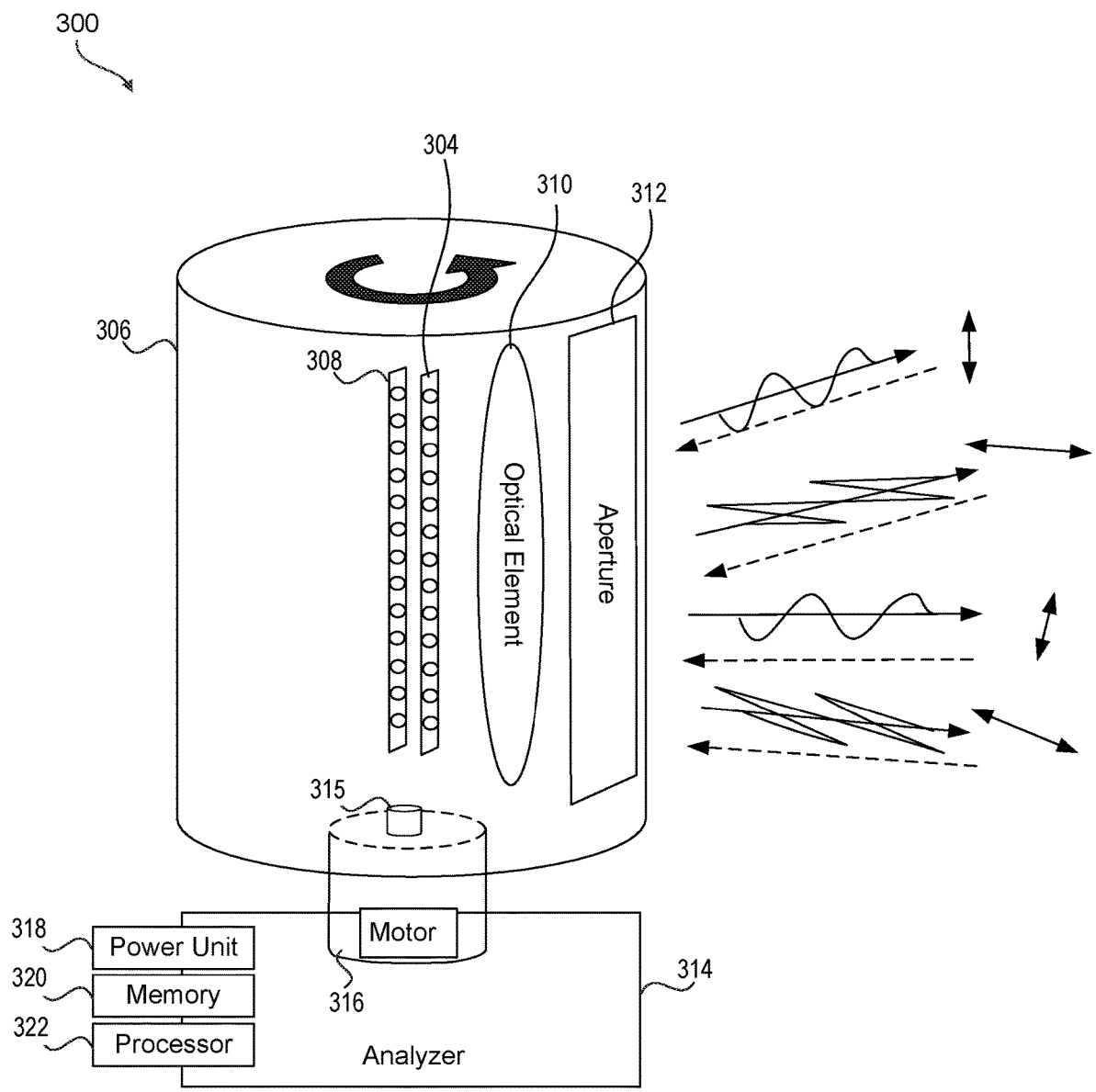
FIG. 3 illustrates an exemplary architecture for a lidar system, in accordance with aspects of the disclosure.

FIG. 3 illustrates an exemplary architecture for a lidar system 300, in accordance with aspects of the disclosure. lidar system 264 of FIG. 2 may be the same as or substantially similar to the lidar system 300. As such, the discussion of lidar system 300 is sufficient for understanding lidar system 264 of FIG. 2.

As shown in FIG. 3, the lidar system 300 includes a housing 306 which may be rotatable 360° about a central axis such as hub or axle 315 of motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the lidar system 300 can emit light through one or more of the aperture(s) 312 and receive reflected light back toward one or more of the aperture(s) 212 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The emitter system 304 may include any number of individual emitters (e.g., 8 emitters, 64 emitters, or 128 emitters). The emitters may emit light of substantially the same intensity or of varying intensities. The lidar system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310. It can be appreciated that the mechanical lidar system described herein is but an example lidar system relied on by aspects of the present solution and that other examples of lidar systems, such as solid state lidar systems may also be implemented.

One or more optical element structures 310 may be positioned in front of a mirror (not shown) to focus and direct light that is passed through the optical element structure 310. As shown below, the system includes an optical element structure 310 positioned in front of a mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

Lidar system 300 includes a power unit 318 to power the light emitting unit 304, a motor 316, and electronic components. Lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

According to some aspects, lidar system 300 may generate and provide an output to a vehicle on-board computing system (e.g., on board computing device 220). Such output may include a three dimensional (3-D) mapping of a perception region (an area illuminated by lidar 264 or lidar 300. According to some aspects the three dimensional mapping may also be referred to as the lidar grid, where grid cells may each provide a proportional representation of the perception region. When an object is detected within the lidar grid, on-board computing device 220 may attempt to estimate a velocity of the object to generate a collision threat assessment and potential navigation instructions to other AV systems. Accordingly, the methods for generating collision probability assessment and velocity estimation are described herein with regard to FIGS. 4-7 below.

Figure 4:
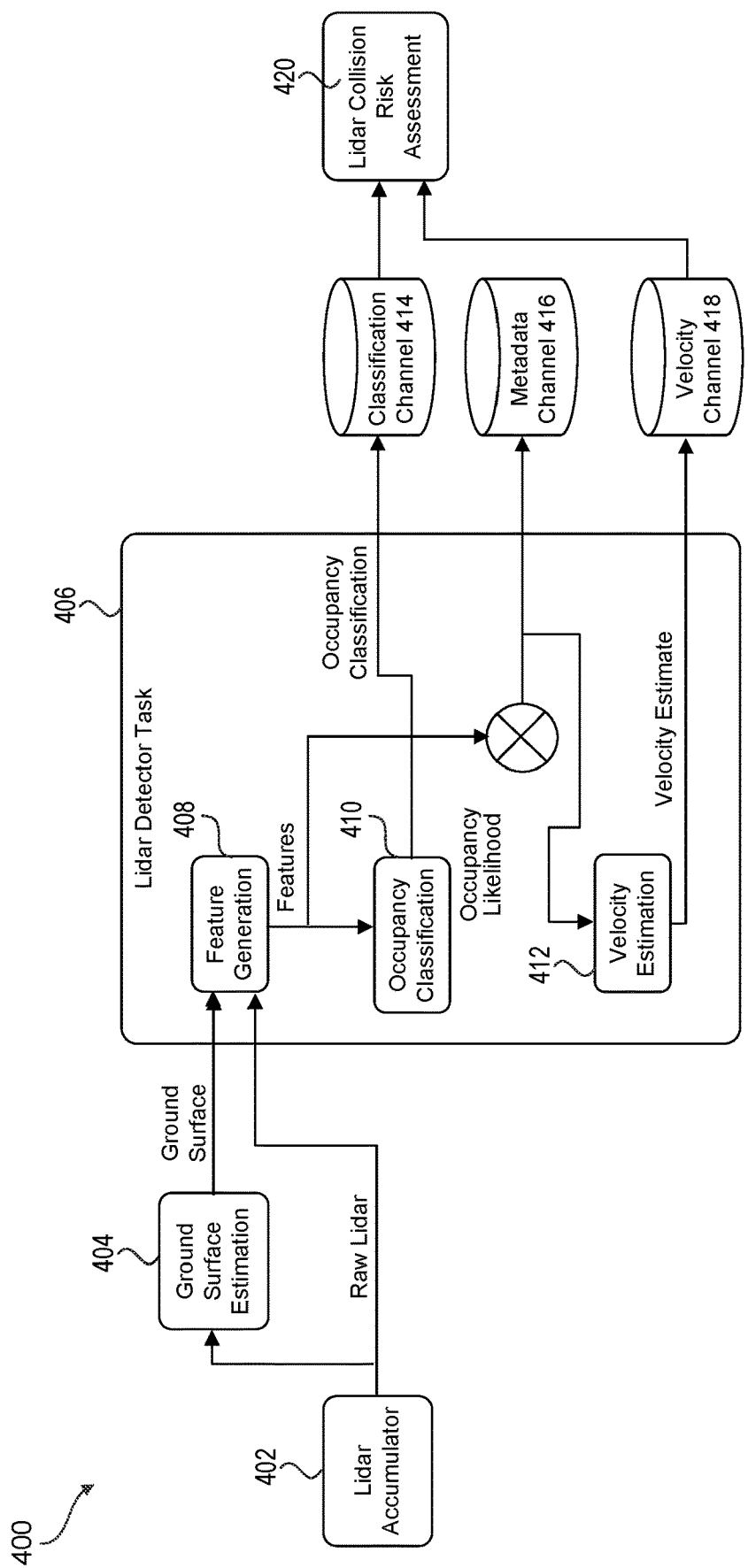
FIG. 4 illustrates an exemplary process for performing collision probability assessment, in accordance with aspects of the disclosure.

FIG. 4 illustrates an exemplary process 400 for performing collision probability assessment, in accordance with aspects of the disclosure. According to aspects of the present disclosure, process 400 converts a lidar grid to an image and applies optical flow techniques to compute delta movements between cells of interest. According to some aspects, this may include creating a grayscale image using occupancy likelihoods, identifying features in two frames, performing a feature-matching process, and using the difference in positions of matched features as inferred movement.

According to some aspects, process 400 may include generating raw lidar data by, for example, a lidar accumulator 402. It can be understood that lidar accumulator 402 may also be integrated within lidar 264 and/or within lidar 300. According to some aspects, a lidar detector such as light detector 308 may generate data packets that represent a point cloud of detected points. According to some aspects the point cloud is then processed by lidar accumulator 402 to generate a lidar grid as raw lidar data. It can be appreciated that the lidar grid is generated at time intervals (also referred to as grid layers) on a continuous or a predetermined time interval basis while the lidar is operating. For example, a first grid layer may be generated at a first time stamp, while a second layer may be generated at a second time stamp. The first time stamp and the second time stamp may be consecutive time stamps. It can be appreciated that the time difference between the layers may be in the order of milliseconds, and may be used downstream by the on-board computing device to generate velocity estimations. In yet another aspect, where non-mechanical lidar systems may be used, for example, a point cloud may be generated every X m/s (X being a predetermined number>0) before a new lidar firing pattern is started. It can be appreciated that a production of a point cloud at predetermined time intervals may also be applied to mechanical lidar systems.

According to some aspects within process 400, lidar 264 or 300 may also generate ground surface estimates 404.

According to some aspects, the ground surface estimates 404 may correspond to a mapping of ground surface heights within the perception region (e.g., side walks, road bumps, hill climb, etc.). According to some aspects, the ground surface estimates can play a role in feature generation and occupancy classification. For example, a goal of occupancy classification is to determine which cells within the lidar grid are occupied—thereby denoting the existence of an object. While this ground surface estimation may reflect road surfaces (which are eliminated in a downstream process as further described herein), this information is important nonetheless to determine if the AV is approaching a curve for example.

According to some aspects within process 400, a series of processes reflective of a lidar detector task 406 may be performed. It can be appreciated that such processes may be performed by a processor associated with the lidar system, or may be performed by on-board computing device 220. Lidar detector task 406 may include a feature generation process 408, an occupancy classification process 410, and a velocity estimation process 412.

In some aspects, feature generation 408 may include summarizing information about the cell. For example, this may include counting the number of points in the cell, determining what is the maximum height above ground of any lidar point in the cell, and the like. This information may be useful to a feature extracting/comparing classifier that operates on features as opposed to raw lidar returns.

According to some aspects, occupancy classification 410 may include taking features of each cell, running it through a classifier, and creating an occupancy likelihood. According to some aspects, occupancy classification 410 may also include applying a threshold to an occupancy likelihood to create the occupancy classification. According to some aspects, the lidar and/or on-board computing device 220 may then output the occupancy classification to the rest of the system via a subscription channel such as classification channel 414. In this manner, components requiring the classification information can subscribe to the classification channel and receive continuous updates of classification information.

According to some aspects, velocity estimation 412 may generate velocity estimates for detected objects within the lidar grid. In doing so, velocity estimation 412 may rely on processes described in FIG. 5 to convert the lidar grid information into an image for further processing. According to some aspects, velocity estimates may also be sent to velocity channel 418 for subscriber components to receive updated information regarding velocity estimates.

According to some aspects, process 400 may also include generating a collision probability assessment 420. As described herein, the probability assessment relies on the occupancy classification and the velocity estimation to determine the collision probability assessment. Based on the level of the probability assessment, on-board computing device 220, for example, may determine a course of action.

Figure 5:
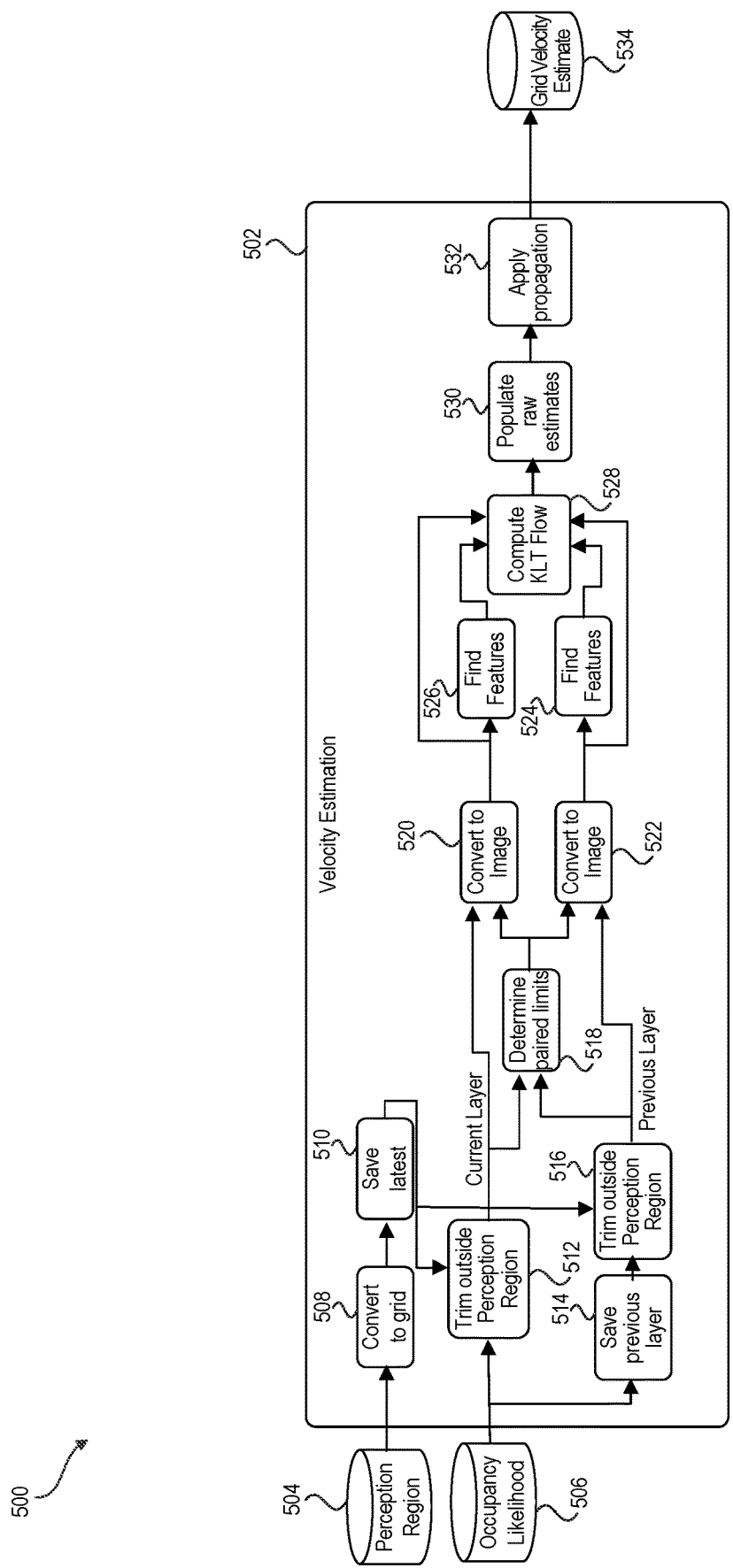
FIG. 5 illustrates an exemplary process for performing velocity estimation, in accordance with aspects of the disclosure.

FIG. 5 illustrates an exemplary process 500 for performing velocity estimation 502, in accordance with aspects of the disclosure. It can be appreciated that velocity estimation 502 may correspond to velocity estimation 412 described within the overall system process.

According to some aspects, process 500 may receive perception region data from perception region data channel 504. It can be understood that the perception region data may be received from any one component or multiple components within process 500. According to some aspects, process 500 may receive occupancy likelihood data from occupancy likelihood data channel 506. It can be appreciated that the occupancy likelihood data may be received by velocity estimation 502 at any one component or multiple components within process 500.

According to some aspects, upon receiving perception region data and occupancy likelihood data, velocity estimation process 500 proceeds to generate a grid velocity estimate 534. In doing so, velocity estimate process 500 may include converting perception region data to grid data at 510 and storing the converted grid data at 510. The storage of the converted grid data includes associating a time stamp with each grid. It can be appreciated that the difference in the time stamps between a pair of grids may be used to extract a lapsed time used to calculate velocity.

According to some aspects, process 500 may trim portions outside perception region to generate a common perception region between a first grid and a second grid. This may be helpful where an object is moving and a common perception region capturing its movement between a first grid and second grid can be useful to establishing a common point of reference. This also helps with feature detection and improves accuracy of detection speed. This step may be illustrated by processes 512 and 516 as it relates to a first grid and a second grid.

According to some aspects, process 500 may also include a saved previous layer (e.g., grid captured at an earlier time stamp) as represented by process 514. It can be appreciated that in this regard, a previous layer can always form a basis for comparison with the latest incoming converted grid. As noted herein, the time stamps between consecutive layers may be in the order of milliseconds or microseconds. In one non-limiting example, the time difference between a first captured grid and a second consecutively captured grid may be 100 ms. It can be appreciated that other time periods may also be used.

According to some aspects, process 500 may include determining paired limits for each grid layer as shown in process 518. According to some aspects, this process may include determining an extent of each grid and generating a common perception region between the grids. According to some aspects, a portion of a grid may typically be filled at any time. In other words, the grid may be filled in a rectangular region spanning grid coordinates (1000, 2000) to (1700, 2500). According to some aspects, mapping a grid to an image may be done without including the empty portions. As such, determining the extent of the grid (by removing empty cells) enables such mapping by explicitly determining where data can be found in the lidar grid (e.g., where there is or is not any data found). This process may further include mapping a coordinate system for each grid representing the perception region with a corresponding coordinate system of a corresponding image being created. When converting a first and second grid layer into a first and second image, as shown in processes 520 and 522, each grid cell may be translated or converted to a corresponding pixel.

According to some aspects, process 500 may also include feature finding processes 524 and 526 to identify features within the converted images. Example feature finding processes may include, but are not limited to, a Harris or Shi-Tomasi corner detection processes that detect corners and infer features of the image. Example features may include detected objects within the perception region. It can be appreciated that detected objects may include different occupancy likelihood values for one or more cells indicative of the presence of an object. According to some aspects, feature finding process may also rely on predetermined key point detection (irrespective of whether an object is detected or not). Key point detection may be a selection of predetermined grid cells (now converted into pixels). In doing so, process 500 may bypass one or both feature finding processes 524 and 526 respectively, as the activity here relates to identifying a specific pixel in a first image (representative of a key point), and comparing its location in the second image. This step may be illustrated by the bypass lines bypassing find features 524 and 526 and directly providing the converted images to a classifier.

According to some aspects, process 500 may also include performing a feature tracking and extraction process 528 (e.g., a Kanade-Lucas-Tomasi (KLT) process) to extract the common features and/or key points between the images. According to some aspects, process 500 may also include populating raw estimates (or calculating a grid velocity) 530. Process 530 may include measuring a distance between the detected features in the first and second images and dividing the distance by the time lapse. It can be appreciated that measuring the distance may include a two-step process where in during the first step, on-board computing device 220 may calculate a distance between the detected feature/object/key point between the two images. In a second step, on-board computing device 220 may determine the real life distance corresponding to the image distance based on an image resolution that indicates the actual real life size corresponding to pixel dimension.

It can be appreciated that a directional component of an object's velocity may also be determined by on-board computing device 220. For example, on-board computing device 220 may generate a direction projection for the object based on a detected change in location between the first image and the second image. In yet another example, on-board computing device 220 may generate a direction projection for the object based on detected intensity changes between the pixels and/or size difference of the object between the images.

According to some aspects, process 500 may also include applying propagation calculations 532 to generated velocity estimates for all the cells. This process may be beneficial in cases where a sparse optical flow method is utilized. In other words, a method by which only a few key points or detected object features are captured is beneficial in providing expedient computations while maintaining the integrity of computational bandwidth of the system. It can be appreciated that propagation calculation 532 may not be necessary in a dense optical flow process where velocity estimates are generated for every cell. It can be understood that relying on dense optical flow processes may be a computationally expensive process.

Figure 6:
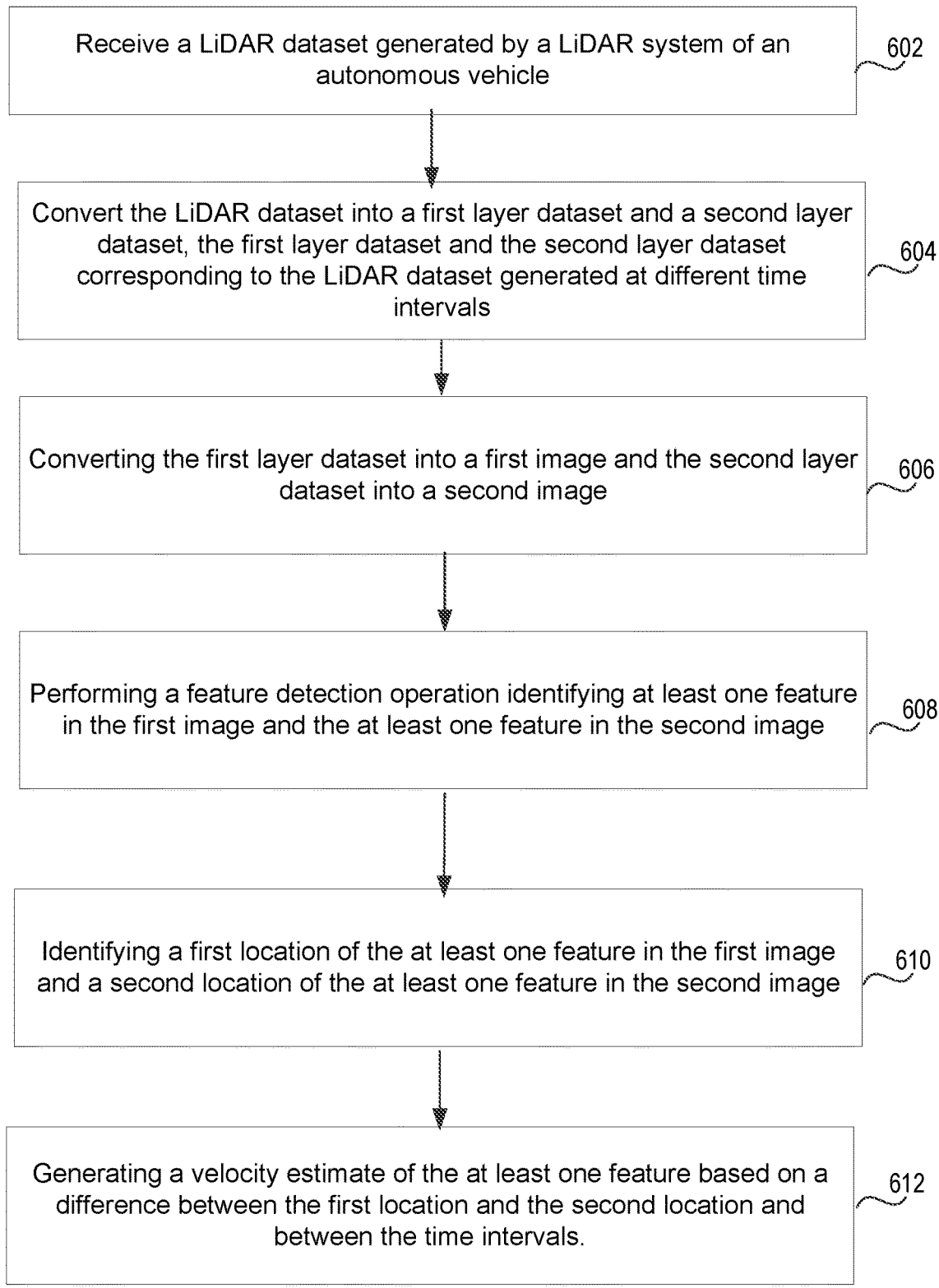
FIG. 6 illustrates an example method for performing velocity estimation of objects in a lidar grid, in accordance with aspects of the disclosure.

FIG. 6 illustrates an example method 600 for performing velocity estimation of objects in a lidar grid, in accordance with aspects of the disclosure. According to some aspects, method 600 may be implemented by on-board computing device 220 to measure velocity of an object detected by lidar 264.

According to some aspects, at 602, method 600 may include receiving a lidar dataset generated by lidar 264. As discussed herein, lidar 264 may generate a 3D mapping of a perception area (e.g., lidar dataset) by transmitting and processing received laser pulses. In some examples, the three dimensional mapping may also be referred to as the lidar grid, where grid cells may each provide a proportional representation of the perception region. When an object is detected within the lidar grid, on-board computing device 220 may attempt to estimate a velocity of the object to generate a collision threat assessment and potential navigation instructions to other AV systems.

According to some aspects, at 604, method 600 may include transforming the lidar dataset into a first layer dataset and a second layer dataset. It can be appreciated that the first layer dataset and the second layer dataset may correspond to the lidar dataset generated at different time intervals. For example the first layer dataset may be generated or reflective of a mapping performed at T0, while the second layer dataset may be generated or reflective of a mapping performed at T1, where T1 is subsequent to T0. In some examples T1 may be a time interval directly following T0. In some examples, the time interval for T0 and/or T1 may be 100 ms or any other value sufficient to capture the dataset.

According to some aspects, at 606, method 600 may include converting the first layer dataset into a first image and the second layer dataset into a second image. As discussed herein with reference to FIG. 5, on-board computing device may be configured to convert each lidar grid into a corresponding image and performing optical flow operations on the converted images. In this regard, due to this conversion of the lidar grid to images and subsequent optical processing flow operations, on-board computing device may perform processes to generate velocity estimation in a reduced time period, with a reduced computational bandwidth, and with increased accuracy. For example, the processing required to generate the lidar dataset can be performed with existing systems, and the optical flow processing of the generated images may also be performed with existing systems, thereby reducing need for an on-board Graphical Processing Unit (GPU) to handle these processes. For example, the conversion of lidar grid layers to images may be considered a sparse process (e.g., relatively few features being tracked from frame to frame) that can be sufficiently handled by existing systems like on-board computing device 220. Moreover, as described herein, the generation of the velocity prediction, and the improved accuracy in generating the velocity prediction can lead to improved safety measures. This, in turn, can also lead to less processing bandwidth required because the on-board computing device is processing less operations for fewer pixels within the images.

According to some aspects, at 608, method 600 may include performing a feature detection operation that identifies at least one feature in the first image and the at least one feature in the second image. It can be appreciated that the feature detection operation may be performed using any detection algorithm that can detect features within images. According to some examples, the features may be key points within the images such that the algorithm is preconfigured to process pixels associated with the predetermined key points. In other examples, the feature detection may correspond to detecting occupied cells, as is further described in FIG. 7. According to some aspects, key points may be pre-identified points, or points that are deemed of interest to a feature detection process. In one example, key points may be corners in the image (tracked by feature finding algorithms like Harris, Shi-Tomasi or FAST corners algorithms). Other key points may be predetermined pixels on the image grid or pixels considered of interest due to occupancy level, for example.

According to some aspects, at 610, method 600 may include locating a first location of the at least one feature in the first image and a second location of the at least one feature in the second image. For example, assuming the object may be a cyclist 114 or a pedestrian 116 or the like, on-board computing device may be configured to locate a first position of the cyclist within the first image and then locate a second position of the cyclist within the second image, and determine the difference in positions between the first image and the second image. In some examples, this may be performed by identifying a coordinate corresponding to the first position and a coordinate corresponding to the second position, and measuring a distance between the coordinates. For example, with reference to velocity estimation process 500 of FIG. 5, on-board computing device 220 may generate coordinates at steps 518, 520, 522, and 524. In some examples, the first location corresponds to a first set of coordinates in the first image and the second location corresponds to a second set of coordinates in the second image, where a coordinate grid associated with the first set of coordinates is the same as a coordinate grid associated with the second set of coordinates. This enables on-board computing device 220 to accurately and expediently measure the distance.

In some aspects, at 612, method 600 may include generating a velocity estimate of the at least one feature based on a difference between the first location and the second location and a difference between the different time intervals. As discussed herein, the measurement may be based on a measured distance on the images. Knowing what distance each pixel corresponds to in the real world, on-board computing device may calculate the actual distance traveled and generate a velocity estimate by dividing that distance by the time interval between the first image and the second image (e.g., 100 ms).

Figure 7:
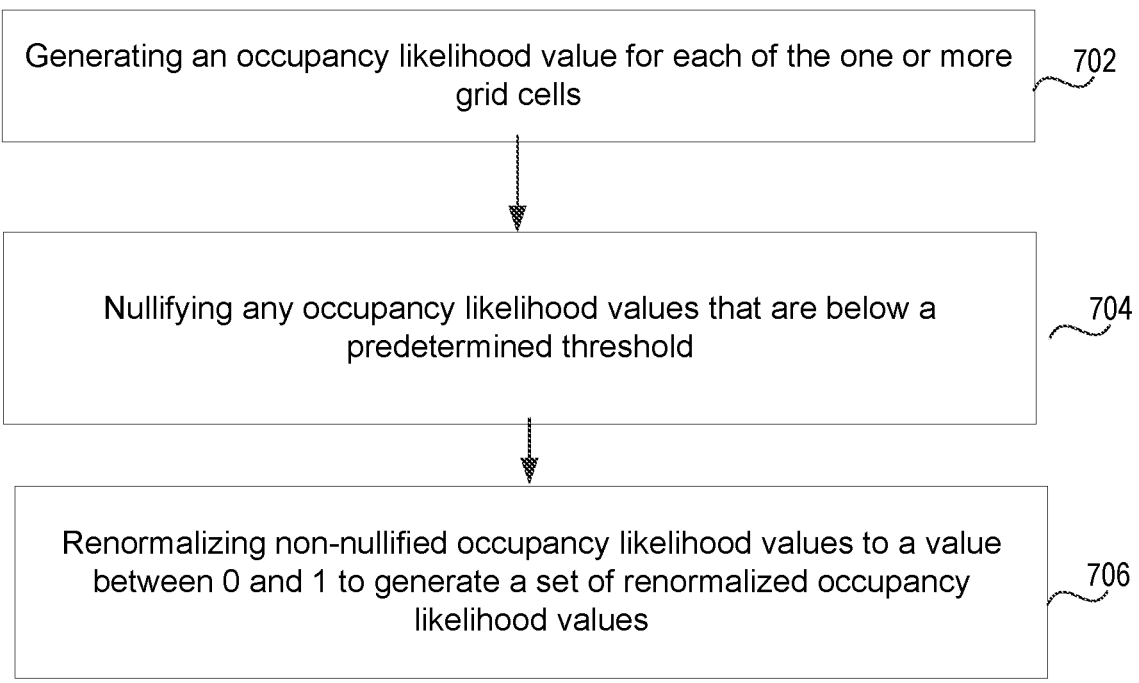
FIG. 7 illustrates an example method for generating occupancy likelihoods for grid cells of a captured lidar grid, in accordance with aspects of the disclosure.

FIG. 7 illustrates an example method 700 for generating occupancy likelihoods for grid cells of a captured lidar grid, in accordance with aspects of the disclosure. It can be appreciated that the occupancy likelihoods may be used by on-board computing device 220 to generate the first image and the second image. This will then enable computing device 220 to perform optical flow processes on the images. As noted herein, the conversion from lidar grid to images and subsequent processing of the images requires less computational power than if processing is done by a GPU performing analysis on captured images. In this regard, velocity measurements may not need to rely on processing operations of captured image data. This may be relevant where the disclosed capabilities are incorporated within a backup/redundant navigation system because such backup systems may not need to use computational bandwidth of a GPU (located within in a primary system and/or require a second GPU) to perform the processing operations.

It can be appreciated that each of the first layer dataset and the second layer dataset corresponds to a lidar grid including one or more grid cells. As such, according to some aspects, at 702, method 700 may reflect a conversion operation including generating an occupancy likelihood value for each of the one or more grid cells. This conversion may be done by detecting an occupancy value for each grid cell and assigning it a corresponding intensity value to each pixel. For example, a grid cell with a 70% occupancy may be assigned a 70% intensity likelihood to the corresponding pixel.

According to some aspects, at step 704, method 700 may include a nullifying operation of any occupancy likelihood values that are below a predetermined threshold. For example, when generating the 3D mapping of a perception region, lidar 264 may illuminate and generate data for elements like the road itself, which will provide a certain intensity feedback that will result in some level of an occupancy likelihood (e.g., 20% or 30%). Processing these pixels may be cumbersome for the on-board computing device and is not necessary, since on-board computing device 220 is configured to identify a few key points or objects within the images to track. Accordingly, by nullifying likelihood values below a certain threshold (e.g., 70%, or any other value), on-board computing device can focus on tracking a detected object in the image and not other ancillary aspects of the road like the road surface itself.

According to some aspects, at step 704, method 700 may include renormalizing non-nullified occupancy likelihood values to a value between 0 and 1 to generate a set of renormalized occupancy likelihood values. As discussed herein, this may be considered a type of filtering mechanism that can help on-board computing device 220 to filter out aspects captured in the 3D map that are not relevant to an object or object detection. Based on the renormalizing step, on-board computing device 220 may generate a gray-scale image comprising one or more pixels corresponding to the one or more grid cells, wherein an intensity value for each one of the one or more pixels corresponds to a renormalized occupancy likelihood value from the set of renormalized occupancy likelihood values. In some examples, a grid cell coordinate in the lidar grid corresponds to a pixel cell coordinate in the image. This can enable on-board computing device 220 to accurately track the location of the object.

Figure 8:
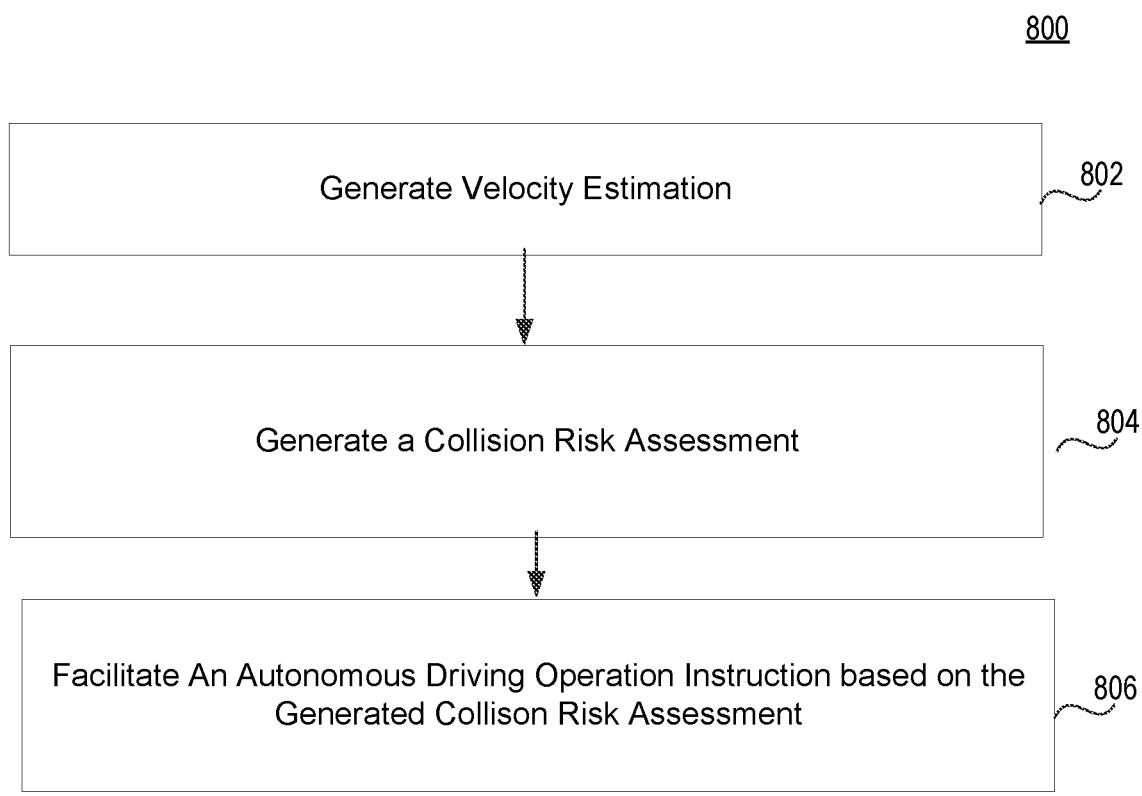
FIG. 8 illustrates an example method for generating an autonomous vehicle course of action, in accordance with aspects of the disclosure.

FIG. 8 illustrates an example method 800 for generating an autonomous vehicle course of action, in accordance with aspects of the disclosure. According to some aspects, on-board computing device 220 may generate a common perception region including the first layer dataset and the second layer dataset. This common perception region can help normalize the coordinates between the first layer dataset and the second layer dataset.

According to some aspects, at 802, method 800 may include generating a collision probability assessment corresponding to a collision likelihood (or collision probability) between a vehicle associated with the lidar system (e.g., AV 102a) and an object within the common perception region (e.g., cyclist 116).

Based on the collision probability assessment, at 804, method 800 may include facilitating at least one autonomous driving operation instruction. This may include instructions relating to acceleration, steering for direction/path changing operation, breaking, and the like.

Figure 9:
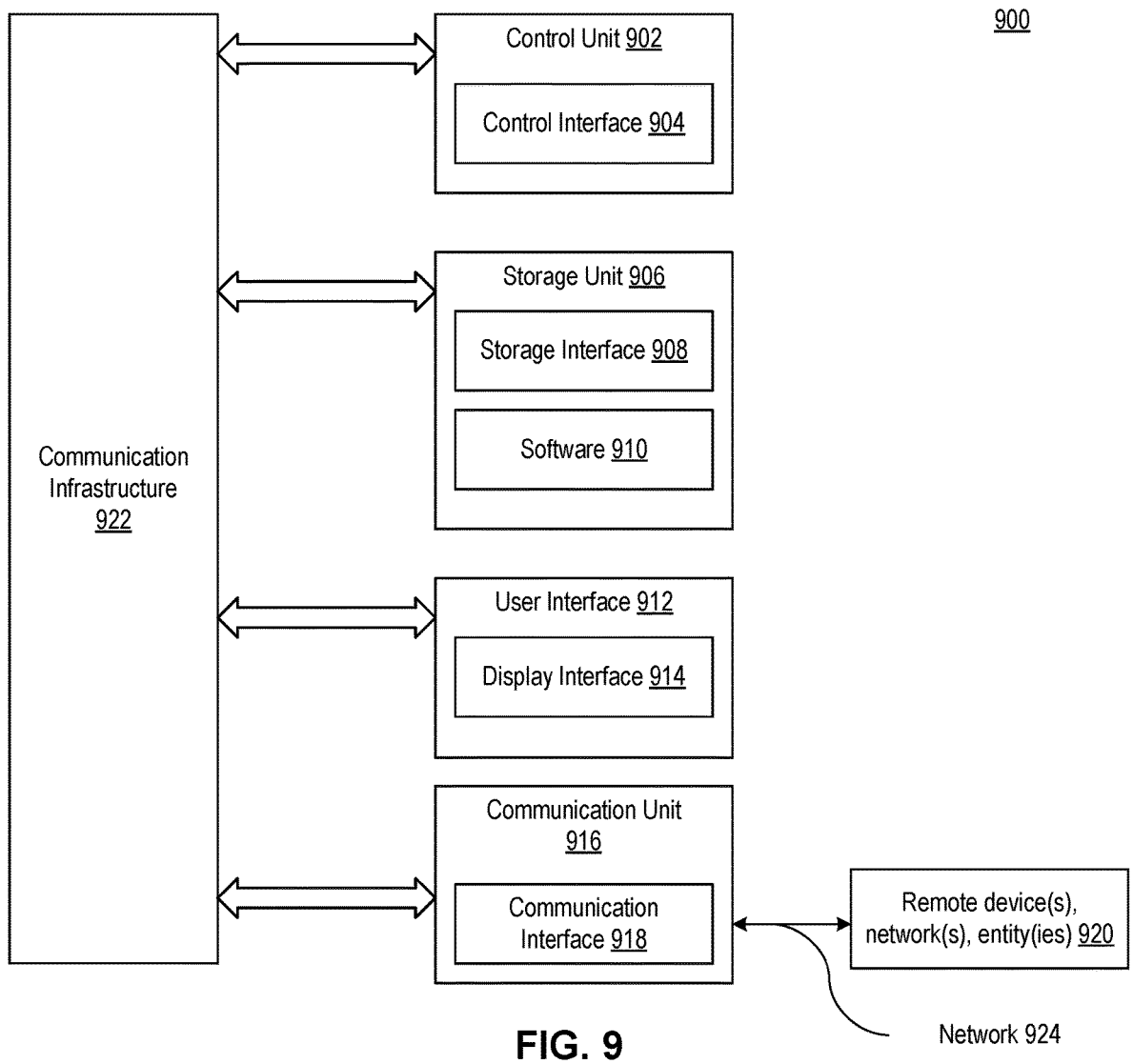
FIG. 9 is an example computer system useful for implementing various embodiments.

FIG. 9 shows an example architecture 900 of the components implementing processes 400 and 500 in an aspect of the present disclosure. In aspects, the components may be integrated with the autonomous vehicle 102a. For example, the components may be integrated with the vehicle on-board computing device 220. In aspects, the components can include a control unit 902, a storage unit 906, a communication unit 916, and a user interface 912. The control unit 902 may include a control interface 904. The control unit 902 may execute a software 910 to provide some or all of the intelligence for implementing processes 400 and 500. The control unit 902 may be implemented in a number of different ways. For example, the control unit 902 may be a processor (a CPU and/or a GPU), an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 904 may be implemented in different ways and may include different implementations depending on which remote devices 920 are being interfaced with the control unit 902. For example, the control interface 904 may be implemented with optical circuitry, waveguides, wireless circuitry, wireline circuitry to attach to a bus, an application programming interface, or a combination thereof. The control interface 904 may be connected to a communication infrastructure 922, such as a bus, to interface with the functional units or devices implementing processes 400 and 500 or remote devices 920.

The storage unit 906 may store the software 910. For illustrative purposes, the storage unit 906 is shown as a single element, although it is understood that the storage unit 906 may be a distribution of storage elements. Also for illustrative purposes, the storage unit 906 is shown as a single hierarchy storage system, although it is understood that the storage unit 906 may be in a different configuration. For example, the storage unit 906 may be formed with different storage technologies forming a memory hierarchical system including different levels of caching, main memory, rotating media, or off-line storage. The storage unit 906 may be a volatile memory, a nonvolatile memory, an internal memory, an external memory, or a combination thereof. For example, the storage unit 906 may be a nonvolatile storage such as nonvolatile random access memory (NVRAM), Flash memory, disk storage, or a volatile storage such as static random access memory (SRAM) or dynamic random access memory (DRAM).

The storage unit 906 may include a storage interface 908. The storage interface 908 may be utilized for communication between the storage unit 906 and other functional units or devices implementing processes 400 and 500. The storage interface 908 may also be utilized for communication with external computing systems. The storage interface 908 may receive information from the other functional units or devices implementing processes 400 and 500 or from remote devices 920, or may transmit information to the other functional units or devices or to remote devices 920. The storage interface 908 may include different implementations depending on which functional units or devices implementing processes 400 and 500 or remote devices 920 are being interfaced with the storage unit 906. The storage interface 908 may be implemented with technologies and techniques similar to the implementation of the control interface 904.

The communication unit 916 may allow communication to devices, components, modules, or units implementing processes 400 and 500 or to remote devices 920.

The network 108 may span and represent a variety of networks and network topologies. For example, the network 108 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 108. Cable, Ethernet, digital subscriber line (DSL), fiber optic lines, fiber to the home (FTTH), and plain old telephone service (POTS) are examples of wired communication that may be included in the network 108. Further, the network 108 may traverse a number of network topologies and distances. For example, the network 108 may include direct connection, personal area network (PAN), local area network (LAN), metropolitan area network (MAN), wide area network (WAN), or a combination thereof.

The communication unit 916 may also function as a communication hub allowing computing systems implementing processes 400 and 500 to function as part of the network 108 and not be limited to be an end point or terminal unit to the network 108. The communication unit 916 may include active and passive components, such as microelectronics or an antenna, for interaction with the network 108.

The communication unit 916 may include a communication interface 918. The communication interface 918 may be utilized for communication between the communication unit 916 and other functional units or devices or to remote devices 920. The communication interface 918 may receive information from the other functional units or devices, or from remote devices 920, or may transmit information to the other functional units or devices or to remote devices 920. The communication interface 918 may include different implementations depending on which functional units or devices are being interfaced with the communication unit 916. The communication interface 918 may be implemented with technologies and techniques similar to the implementation of the control interface 904.

The user interface 912 may present information generated by computing systems implementing processes 400 and 500. In aspects, the user interface 912 allows a user to interface with the devices of computing systems implementing processes 400 and 500 or remote devices 920. The user interface 912 may include an input device and an output device. Examples of the input device of the user interface 912 may include a keypad, buttons, switches, touchpads, soft-keys, a keyboard, a mouse, or any combination thereof to provide data and communication inputs. Examples of the output device may include a display interface 914. The control unit 902 may operate the user interface 912 to present information generated by computing systems implementing processes 400 and 500. The control unit 902 may also execute the software 910 to present information generated by, or to control other functional units of computing systems implementing processes 400 and 500. The display interface 914 may be any graphical user interface such as a display, a projector, a video screen, or any combination thereof.

It is to be appreciated that the detailed description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for measuring velocity of an object detected by a light detection and ranging (lidar) system, the method comprising:
   receiving, by a computing device, a lidar dataset generated by the lidar system;
   transforming, by the computing device, the lidar dataset into a first layer dataset and a second layer dataset, the first layer dataset and the second layer dataset corresponding to the lidar dataset generated at different time intervals, each of the first layer dataset and the second layer dataset corresponds to a lidar grid including one or more grid cells;
   converting, by the computing device, the first layer dataset into a first image and the second layer dataset into a second image by:
      generating, by the computing device, an occupancy likelihood value for each of the one or more grid cells,
      nullifying, by the computing device, any occupancy likelihood values that are below a predetermined threshold, and
      renormalizing, by the computing device, non-nullified occupancy likelihood values to a value between 0 and 1 to generate a set of renormalized occupancy likelihood values;
   performing, by the computing device, a feature detection operation that identifies at least one feature in the first image and the at least one feature in the second image;
   locating, by the computing device, a first location of the at least one feature in the first image and a second location of the at least one feature in the second image; and
   generating, by the computing device, a velocity estimate of the at least one feature based on a difference between the first location and the second location and a difference between the different time intervals.

2. The method of claim 1, wherein the first location corresponds to a first set of coordinates in the first image and the second location corresponds to a second set of coordinates in the second image.

3. The method of claim 1, wherein the converting further comprises:
   generating, by the computing device, a gray-scale image comprising one or more pixels corresponding to the one or more grid cells, wherein an intensity value for each one of the one or more pixels corresponds to a renormalized occupancy likelihood value from the set of renormalized occupancy likelihood values.

4. The method of claim 3, wherein a grid cell coordinate in the lidar grid corresponds to a pixel cell coordinate in the gray-scale image.

5. The method of claim 1, wherein the different time intervals consecutively follow one another.

6. The method of claim 1, further comprising:
   generating, by the computing device, a common perception region including the first layer dataset and the second layer dataset, wherein the at least one feature is detected within the common perception region.

7. The method of claim 6, further comprising:
   generating, by the computing device, a collision probability assessment corresponding to a collision likelihood between a vehicle associated with the lidar system and an object within the common perception region.

8. The method of claim 7, further comprising:
facilitating, by the computing device, at least one autonomous driving operation instruction based on the generated collision probability assessment.

9. The method of claim 8, wherein the at least one autonomous driving operation includes a breaking braking operation or a path changing operation.

10. A computing system for measuring velocity of an object detected by a light detection and ranging (lidar) system, the computing system comprising:
a storage unit configured to store instructions; and
processor coupled to the storage unit, the processor being configured to
receive a lidar dataset generated by the lidar system,
transform the lidar dataset into a first layer dataset and a second layer dataset, the first layer dataset and the second layer dataset corresponding to the lidar dataset generated at different time intervals, each of the first layer dataset and the second layer dataset corresponds to a lidar grid including one or more grid cells,
convert the first layer dataset into a first image and the second layer dataset into a second image, to convert the first layer dataset:
generate an occupancy likelihood value for each of the one or more grid cells,
nullify any occupancy likelihood values that are below a predetermined threshold, and
renormalize non-nullified occupancy likelihood to a value between 0 and 1 to generate a set of renormalized occupancy likelihood values,
perform a feature detection operation that identifies at least one feature in the first image and the at least one feature in the second image,
locating a first location of the at least one feature in the first image and a second location of the at least one feature in the second image, and
generate a velocity estimate of the at least one feature based on a difference between the first location and the second location and a difference between the different time intervals.

11. The computing system of claim 10, wherein the first location corresponds to a first set of coordinates in the first image and the second location corresponds to a second set of coordinates in the second image.

12. The computing system of claim 10, wherein the processing circuitry is further configured to:
generate a gray-scale image comprising one or more pixels corresponding to the one or more grid cells,
wherein an intensity value for each one of the one or more pixels corresponds to a renormalized occupancy likelihood value from the set of renormalized occupancy likelihood values.

13. The computing system of claim 12, wherein a grid cell coordinate in the lidar grid corresponds to a pixel cell coordinate in the gray-scale image.

14. The computing system of claim 10, wherein the different time intervals consecutively follow one another.

15. The computing system of claim 10, wherein the processing circuitry is further configured to:
generate a common perception region including the first layer dataset and the second layer dataset, wherein the at least one feature is detected within the common perception region.

16. The computing system of claim 15, wherein the processing circuitry is further configured to:
generate a collision probability assessment corresponding to a collision likelihood between a vehicle associated with the lidar system and an object within the common perception region.

17. The computing system of claim 16, wherein the processing circuitry is further configured to:
issue one or more instructions to facilitate at least one autonomous driving operation based on the generated collision probability assessment.

18. A non-transitory computer readable medium including instructions when executed by one or more processors, cause the one or more processors to perform operations for measuring velocity of an object detected by a light detection and ranging (lidar) system, the operations comprising:
receiving a lidar dataset generated by the lidar system;
transforming the lidar dataset into a first layer dataset and a second layer dataset, the first layer dataset and the second layer dataset corresponding to the lidar dataset generated at different time intervals, each of the first layer dataset and the second layer dataset corresponds to a lidar grid including one or more grid cells;
converting the first layer dataset into a first image and the second layer dataset into a second image by:
generating, by the computing device, an occupancy likelihood value for each of the one or more grid cells,
nullifying, by the computing device, any occupancy likelihood values that are below a predetermined threshold, and
renormalizing, by the computing device, non-nullified occupancy likelihood values to a value between 0 and 1 to generate a set of renormalized occupancy likelihood values;
performing a feature detection operation that identifies at least one feature in the first image and the at least one feature in the second image;
locating a first location of the at least one feature in the first image and a second location of the at least one feature in the second image; and
generating a velocity estimate of the at least one feature based on a difference between the first location and the second location and a difference between the different time intervals.

* * * * *